June 4, 1946.  E. PRAT DIVI  2,401,662
ELECTRIC MOTOR
Filed Sept. 10, 1943    2 Sheets-Sheet 1
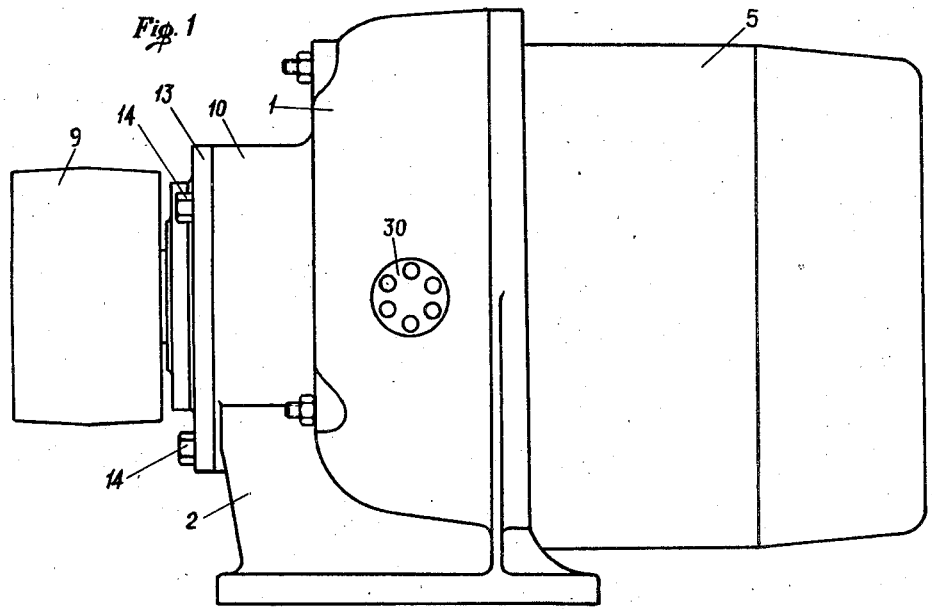
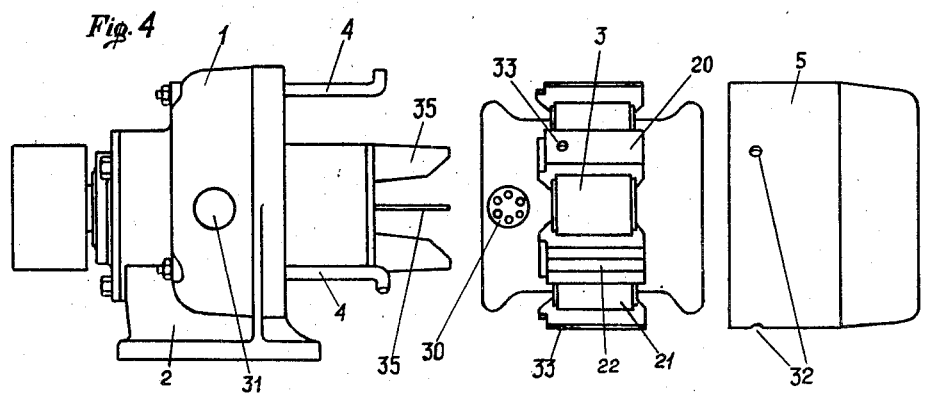
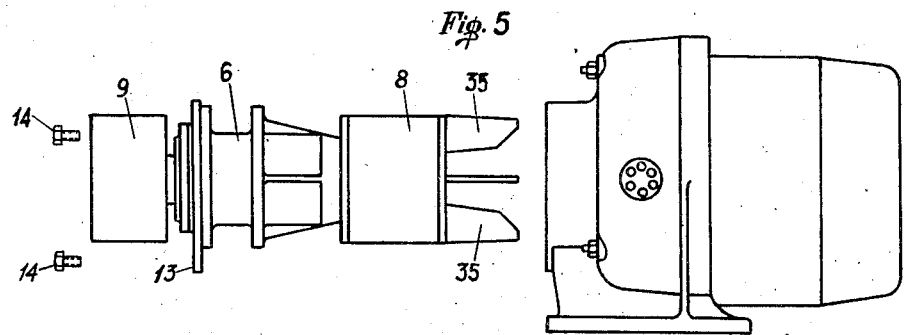

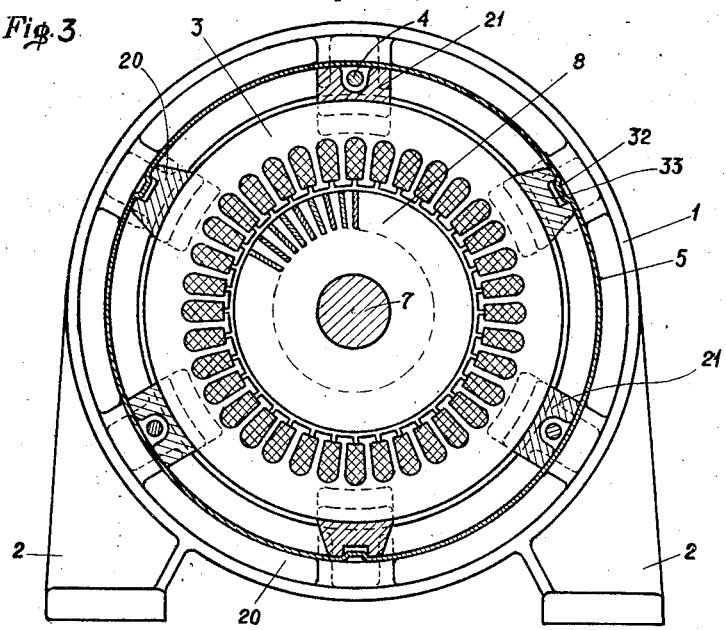
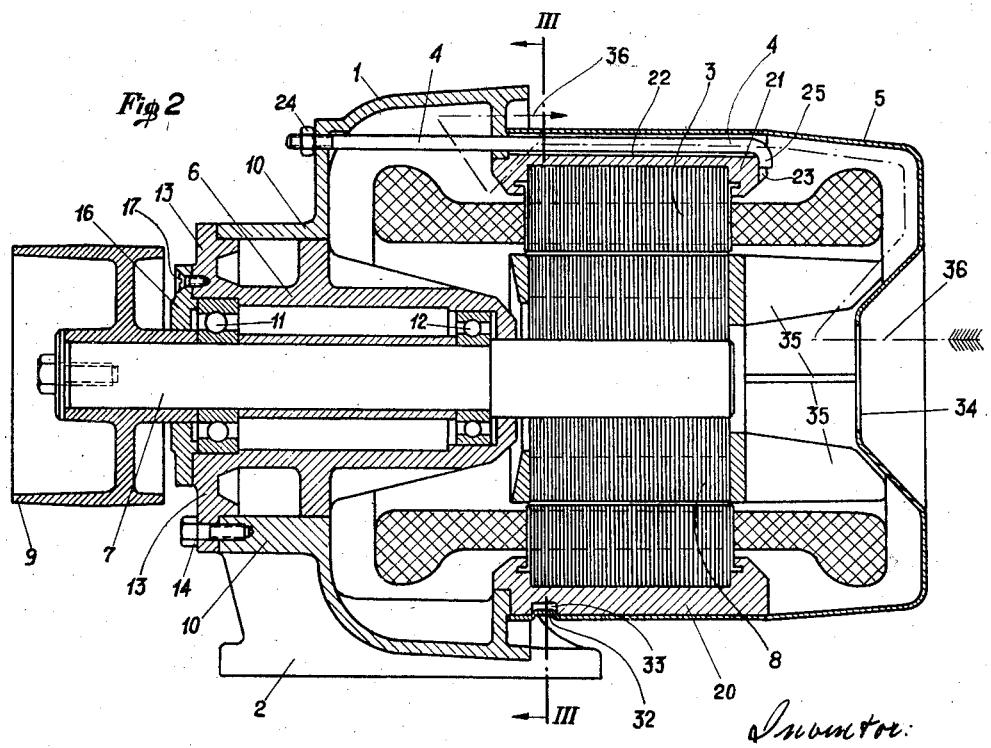

Patented June 4, 1946

2,401,662

UNITED STATES PATENT OFFICE 2,401,662

ELECTRIC MOTOR

Evelio Prat Diví, Badalona, Spain

Application September 10, 1943, Serial No. 501,866
In Spain May 22, 1943

3 Claims. (Cl. 172—36)

My invention refers to electric motors and has for a primary object certain improvements in the construction of such motors, whereby disassembly of the motor and replacement of parts in case of damage are facilitated, without the necessity of removing the motor from its point of installation.

With the present construction of electric motors, when the working of the motor becomes defective, for example due to burning out the winding or to any damage or irregularity in the bearings, it is necessary to take down the motor from its site, take it to the workshop, dismount it carefully in order to repair the damage and afterwards mount it again in its normal place.

This entails the loss of the use of the motor and of the machine or machines operated thereby, for a considerable period of time.

With the improvements which constitute the object of my invention, it is unnecessary to stop the motor or the machinery driven thereby, for any considerable period of time. This is because, in case of damage thereto, the motor may be repaired very quickly in situ by merely removing and replacing the damaged part, whereupon the motor is immediately again available for service. If the damage is in the winding of the stator, this stator is withdrawn completely without disturbing the base or frame of the motor and the stator is replaced by a new one. If the damage is in the rotor or in the bearings, the complete rotor may be withdrawn with the shaft and the bearings and replaced by another, again without the necessity of removing the motor or of touching the stator or other motor parts. As is readily understood, these substitutions may be made in a few moments, so that there is practically no interruption in the operation of the motor in case of damage, and only replacement parts have to be available.

The invention consists essentially in making up the motor of a combination of three units or essential groups of elements; a body or frame which is that fixed in the site of the motor, a fixed unit made up by the stator of the electric machine that is fixed to the frame of the motor by one of its sides, so that it may be easily withdrawn from this side without touching the frame; and a rotary unit made up of a supporting piece that is fixed to the frame and that carries the bearings with the shaft, the rotor and the pulley or other power transmitting part, in such a way that all these parts may be easily withdrawn without touching the body of the motor nor the stator.

In the attached drawings there is shown an example of construction of an electric motor embodying the invention.

Figure 1 is a side elevation of the motor.

Figure 2 is a vertical longitudinal section of the same.

Figure 3 is a cross section through the line III—III of Figure 2.

Figure 4 shows in a schematic manner the way of dismounting the stator, and

Figure 5 shows also in a schematic manner the method of dismounting the rotor or revolving unit.

As is seen in these figures, the motor is made up of a general body or frame of the motor 1 provided with feet 2 to fix the motor in its site; a stator 3 or fixed electric unit of the motor, that is mounted on the frame 1 held by fixing studs or bolts 4 and is protected externally by means of a cover 5; and lastly a rotary unit, made up of a supporting piece 6 which is fixed to the frame 1 and carries the bearings that hold the shaft 7 of the motor together with the rotor 8 and the pulley 9 or other power transmitting element.

As is shown schematically in Figure 4, the cover 5 and stator 3 may be easily withdrawn through the right-hand part (as shown on the drawings) of frame 1, for the purpose of replacing this stator by another in case of damage. Similarly, as shown in Figure 5, the internal assembly constituted by support 6 and shaft 7, rotor 8 and pulley 9, may be easily withdrawn through the left-hand part (as seen on the drawings) of the said frame 1.

To this end, in the form of construction shown, the frame 1 of the motor has on the left side, the collar 10 whose internal diameter is greater than the external diameter of the rotor 8 and in the interior of this collar 10 there is arranged the support 6 that carries the bearings 11, 12, that support the shaft 7 so that this shaft revolves held by its middle part on both bearings while on one of its ends it has fixed the rotor 8 and on the other end the pulley 9 or other power transmitting organ. The support 6 is suitably adjusted in the interior of the collar 10 and forms at its left end a cover 13 which closes this collar 10 and is fixed by a suitable number of screws 14. It is seen therefore that by merely withdrawing these screws 14 the support 6 remains completely free and may be withdrawn from the left side, as is shown in Figure 5 carrying with it all the revolving elements of the motor, that is the bearings, the shaft, the rotor and the pulley.

If desired, the motor may also be constructed so that the support 6 together with the shaft and other rotating parts of the motor may be withdrawn as desired from either side of the frame. For this, the said support 6 is made of such a maximum diameter that it may pass within the stator 3 and is suitably fixed to the collar 10 of the frame by means of screws arranged in a manner to allow the passage of this rotative group in either direction.

The setting up of the unit formed by the support 6 with all the rotative parts of the motor, makes it possible in case of damage, to replace in a few moments this unit by another interchangeable unit, so that the motor may continue its normal working.

The construction of said support 6 is such that once withdrawn from the motor it may be also completely dismounted in order to repair the damaged part of same. It is sufficient for this to withdraw the pulley 9 and also the cover 16 which is held by the screws 17 with which there may be withdrawn from the other end the rotor 8 with the shaft 7, and the bearings may be dismounted. The drawings show ball bearings, but, as can be easily understood, there may be used also ring lubricating bearings or any other suitable system.

As has been stated, the stator 3 of the motor is mounted on the general frame 1 on the opposide side, that is in accordance with the drawings, on the right side. This stator is represented in the drawings as made up of a packet of iron sheets joined together by means of a series of ribs 20, 21 according to the method of construction described in a previous patent of the same applicant, but they could effectively be constructed in any other manner, always providing that their surface should fit suitably in the frame 1 and could remain well centered and held in position by the fixing studs or bolts 4. For the fixing of this stator in the frame 1 there is arranged in three or more ribs 21 of those holding the stator, or at convenient points of the general frame of the stator, some slots 22, 23 in which the fixing bolts 4 fit. The left hand ends of these fixing bolts 4 are fixed to the frame 1 by means of nuts 24 whilst the right hand ends are bent, preferably forming a slightly acute angle and fit in the slots 23 made in the ends of the ribs 21 or in the corresponding parts of the stator.

Owing to this construction, to dismount the stator it is only necessary to loosen slightly the nuts 24 without any need of withdrawing these nuts from the fixing bolts 4; when the ends of the bolts 4 can come out of the slots 23 the bolts are made to turn outwards as is shown in Figure 4 and the stator 3 remains completely free and may be withdrawn, as is seen in this figure, and also may be rapidly substituted by another in order to proceed with the repair of same, should this be necessary.

The electrical connections with the stator are made preferably by means of a connecting piece 30 of rubber or other insulating material which normally extends through the orifice 31 of the frame 1 but may be easily pushed inwards in order to loosen same and allow of the stator 3 being changed.

Once the stator 3 is mounted in the frame 1 this stator is again covered by means of the cover or lid 5 of metal, which does not hold any part of the motor, but only acts to protect the stator.

This cover 5 may be fixed on the motor in any appropriate manner and in the drawings is shown as an example a system of fixing that consists in arranging on the cover 5 a certain number of stamped points 32 that form projections on the interior part and fit elastically in recesses 33 made in the ribs 20 of the stator 3.

In order to facilitate the ventilation of the motor, this cover 5 has on its end a central opening 34 for the entrance of air and the rotor has ventilation fins 35 that cause a draught around the stator 3 approximately following the path shown by the arrow 36 (Figure 2). It is understood, however, that in the same way this motor may be constructed in a completely closed or protected way.

I claim:

1. An electric motor construction comprising three groups of parts: an open-ended motor frame including means for securing the motor to a support, said frame being provided at one end with a peripheral inwardly radially extending flange defining one end opening of said frame, the latter being provided at its other end with an axially extending sleeve defining the other end opening of said frame, said first end opening being substantially larger than said other end opening, said flange constituting an abutment adapted to engage an associated stator unit comprising a stator and having means on one side thereof engageable with said flange, and releasable means for retaining said stator unit and frame in assembled relationship; and a journal support mounted in and extending through said sleeve and comprising bearing means at each end thereof, a rotor shaft journaled in said bearing means, a rotor mounted on said shaft on one side of said journal support and arranged within said stator, the outer diameter of said rotor being less than the inner diameter of said sleeve, and a pulley on said shaft on the other side of said journal support, whereby said stator unit may be dismounted and replaced without disturbing the other groups of parts and said journal support and associated parts may also be dismounted and replaced without disturbing the other group of parts.

2. The relationship of parts recited in claim 1, the releasable means for retaining said stator unit and frame in assembled relationship including a plurality of rotatable bolts extending through said stator and frame, each stator being provided for this purpose with a corresponding number of longitudinally extending slots, each bolt terminating at its inner end in a bent portion in engagement with said stator, a frame-engaging nut threadedly mounted on the other end of each bolt, and said slots being of a magnitude to receive said bent portion when said bolts are turned out of stator-engaging position, whereby upon loosening of said nuts and turning of said bolts out of said position the stator unit may be freely dismounted from the other parts.

3. The relationship of parts according to claim 1, said stator-unit including a sheet metal cover mounted in substantially encompassing relation thereon, and means operatively integrating said cover with said unit.

EVELIO PRAT DIVÍ.